(12) United States Patent
Hayashi et al.

(10) Patent No.: US 9,925,483 B2
(45) Date of Patent: Mar. 27, 2018

(54) BLOW-BY GAS INLET STRUCTURE OF OIL SEPARATOR FOR INTERNAL COMBUSTION ENGINE

(71) Applicant: MAHLE FILTER SYSTEMS JAPAN CORPORATION, Tokyo (JP)

(72) Inventors: Keigo Hayashi, Koshigaya (JP); Atsushi Nonaka, Kawagoe (JP)

(73) Assignee: MAHLE FILTER SYSTEMS JAPAN CORPORATION, Tokyo (JP)

( * ) Notice: Subject to any disclaimer, the term of this patent is extended or adjusted under 35 U.S.C. 154(b) by 258 days.

(21) Appl. No.: 14/969,671

(22) Filed: Dec. 15, 2015

(65) Prior Publication Data
US 2016/0177792 A1 Jun. 23, 2016

(30) Foreign Application Priority Data
Dec. 18, 2014 (JP) ................. 2014-255722

(51) Int. Cl.
  *B01D 45/08* (2006.01)
  *F01M 11/00* (2006.01)
  *F01M 13/00* (2006.01)
  *F01M 13/04* (2006.01)

(52) U.S. Cl.
  CPC ......... *B01D 45/08* (2013.01); *F01M 13/0416* (2013.01); *F01M 11/00* (2013.01); *F01M 13/00* (2013.01); *F01M 2013/0433* (2013.01); *F02B 2275/34* (2013.01)

(58) Field of Classification Search
CPC .... B01D 45/08; F01M 13/0416; F01M 11/00; F01M 13/00; F01M 2013/0433; F02B 2275/34
See application file for complete search history.

(56) References Cited

U.S. PATENT DOCUMENTS

| 2,866,519 | A | * | 12/1958 | Engman | ................. B01D 45/08 55/485 |
| 4,175,937 | A | * | 11/1979 | Brandau | ................. F01M 13/04 123/41.86 |
| 4,597,372 | A | | 7/1986 | Furukawa | |

(Continued)

FOREIGN PATENT DOCUMENTS

| EP | 1 482 136 A1 | 12/2004 |
| EP | 1 524 414 A2 | 4/2005 |
| JP | 2008-297938 A | 12/2008 |

OTHER PUBLICATIONS

Extended European Search Report, dated Jun. 16, 2016, 5 pages.

*Primary Examiner* — Dung H Bui
(74) *Attorney, Agent, or Firm* — Foley & Lardner LLP

(57) ABSTRACT

A blow-by gas inlet structure of an oil separator adapted to be placed above a cam chamber of an internal combustion engine, comprises a plate that forms a bottom wall of the oil separator; a blow-by gas inlet opening that is formed in the plate; an oil blocking structure that is provided below the blow-by gas inlet opening in a manner to divide the blow-by gas inlet opening into front and rear inlet openings through which the blow-by gas is led into the oil separator, the front and rear inlet openings being arranged in a first direction; and a transverse rib that is provided on the oil blocking structure and extends in a second direction that is perpendicular to the first direction.

7 Claims, 6 Drawing Sheets

(56) References Cited

U.S. PATENT DOCUMENTS

| | | | | |
|---|---|---|---|---|
| 5,235,938 A | * | 8/1993 | Haussmann | F01M 13/00 123/184.21 |
| 2004/0244785 A1 | * | 12/2004 | Nishikawa | F01M 13/0416 123/574 |
| 2011/0314779 A1 | * | 12/2011 | Sakaguchi | F01M 13/0416 55/464 |
| 2013/0306043 A1 | | 11/2013 | Spix et al. | |

* cited by examiner

BLOW-BY GAS INLET STRUCTURE OF OIL SEPARATOR FOR INTERNAL COMBUSTION ENGINE

BACKGROUND OF THE INVENTION

1. Field of the Invention

The present invention relates in general to an oil separator employed in an internal combustion engine and more particularly to a blow-by gas inlet structure of the oil separator.

2. Description of the Related Art

In order to clarify features of the present invention, one conventional blow-by gas inlet structure of the oil separator will be briefly described in the following.

Actually, the known blow-by gas inlet structure of the oil separator is shown in Japanese Laid-open Patent Application (tokkai) 2008-297938. This publication shows an internal combustion engine that is provided with an oil separator at a position between a cylinder head cover and a buffle plate. The buffle plate is provided at a rear portion thereof with a blow-by gas inlet opening through which the blow-by gas is led into the oil separator. Below the blow-by gas inlet opening, there is provided an oil blocking plate that extends in parallel with a major surface of the buffle plate for spacedly covering the blow-by gas inlet opening. Under operation of the engine, oil splashed up by intake and exhaust camshafts of the engine is blocked by the oil blocking plate and thus suppressed from directly entering into the oil separator through the blow-by gas inlet opening.

SUMMARY OF THE INVENTION

However, due to inherent construction of the oil blocking plate, even the above-mentioned blow-by gas inlet structure fails to exhibit a satisfied oil blocking effect. Actually, in such known blow-by gas inlet structure, part of the oil splashed up by the intake and exhaust camshafts is led into the blow-by gas inlet opening from open zones provided at both sides of the oil blocking plate.

Accordingly, an object of the present invention is to provide a blow-by gas inlet structure of an oil separator for an internal combustion engine, which is free of the above-mentioned drawback.

In accordance with a first aspect of the present invention, there is provided a blow-by gas inlet structure of an oil separator adapted to be placed above a cam chamber (3) of an internal combustion engine, which comprises a plate (2) that forms a bottom wall of the oil separator; a blow-by gas inlet opening (4) that is formed in the plate (2); an oil blocking structure (11) that is provided below the blow-by gas inlet opening (4) in a manner to divide the blow-by gas inlet opening (4) into front and rear inlet openings (16, 16) through which the blow-by gas is led into the oil separator, the front and rear inlet openings (16, 16) being arranged in a first direction; and a transverse rib (9) that is provided on the oil blocking structure (11) and extends in a second direction that is perpendicular to the first direction.

In accordance with a second aspect of the present invention, there is provided a blow-by gas inlet structure of an oil separator adapted to be placed above a cam chamber (3) of an internal combustion engine, which comprises a plate (2) that forms a bottom wall of the oil separator; a blow-by gas inlet opening (4) that is formed in the plate (2); an oil blocking structure (11) that is provided below the blow-by gas inlet opening (4) in a manner to divide the blow-by gas inlet opening (4) into front and rear inlet openings (16, 16) through which the blow-by gas is led into the oil separator, the front and rear inlet openings (16, 16) being arranged in a first direction; a transverse rib (9) that is provided on the oil blocking structure (11) and extends in a second direction that is perpendicular to the first direction; and first and second longitudinal ribs (10, 10) that are provided on the oil blocking structure and extend across the blow-by gas inlet opening (4) in the first direction.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, embodiments of the present invention will be described in detail with reference to the accompanying drawings.

First, a blow-by gas inlet structure of a first embodiment of the present invention will be described with reference to FIGS. 1 to 5 of the drawings.

Figure 1:
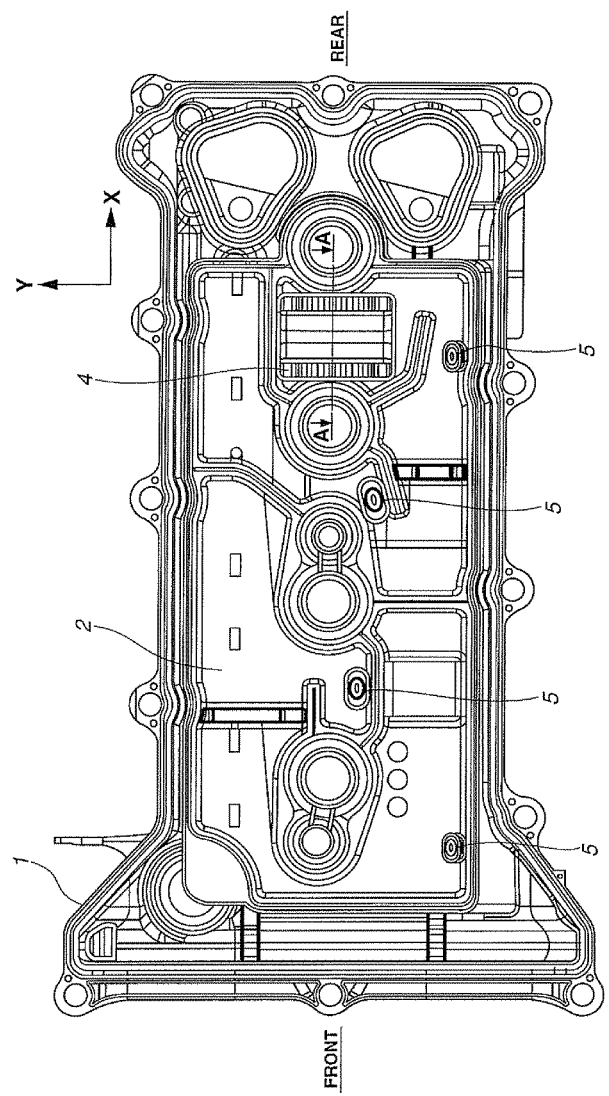
FIG. 1 is a bottom view of a cylinder head cover with a buffle plate provided beneath the bottom of the cylinder head cover.

In FIG. 1, there is shown a bottom of a cylinder head cover 1 of synthetic resin for an internal combustion engine. Tightly disposed on the bottom of the cylinder head cover 1 is a buffle plate 2 of synthetic resin that is spaced from the bottom of the cylinder head cover by a given small distance. It is to be noted that the view of FIG. 1 is taken from the position of a cam chamber 3 of the engine (see FIG. 3).

Although not shown in the drawings, between the cylinder head cover 1 and the buffle plate 2, there is defined a chamber of an oil separator (viz., oil separator chamber) by which oil and oil mist in the blow-by gas led into the oil separator chamber is separated. The buffle plate 2 forms a bottom wall of the oil separator.

The buffle plate 2 is formed with a blow-by gas inlet opening 4 through which the blow-by gas is led into the oil separator chamber. In the illustrated embodiment, the blow-by gas inlet opening 4 is rectangular in shape.

That is, when the blow-by gas is led into the oil separator chamber from the blow-by gas inlet opening 4, oil and oil mist are separated from the blow-by gas and form liquid oil. The liquid oil thus formed in the oil separator chamber flows down to the cam chamber 3 through oil drains 5 (see FIG. 1) formed in the buffle plate 2. The blow-by gas thus free of the oil (or oil mist) is forced to flow in the oil separator chamber while making a U-turn flow and led to the outside of the cylinder head cover 1 from an outlet (not shown) formed in the cylinder head cover 1. Usually, the oil free blow-by gas is then led to an intake system of the internal combustion engine for the purpose of suppressing air pollution.

In the following, the detail of the blow-by gas inlet structure of the first embodiment will be described with the aid of the drawings.

For facilitating the following description, a longitudinal direction of the cylinder head cover 1 will be called X-direction, a width direction of the cylinder head cover 1 will be called Y-direction and a direction perpendicular to both X-direction and Y-direction will be called Z-direction.

It is to be noted that the engine to which the cylinder head cover 1 shown in FIG. 1 is mounted is of a longitudinally mounted type, and thus, a left side of FIG. 1 corresponds to a front side of the engine and a right side of FIG. 1 corresponds to a rear side of the engine.

Figure 2:
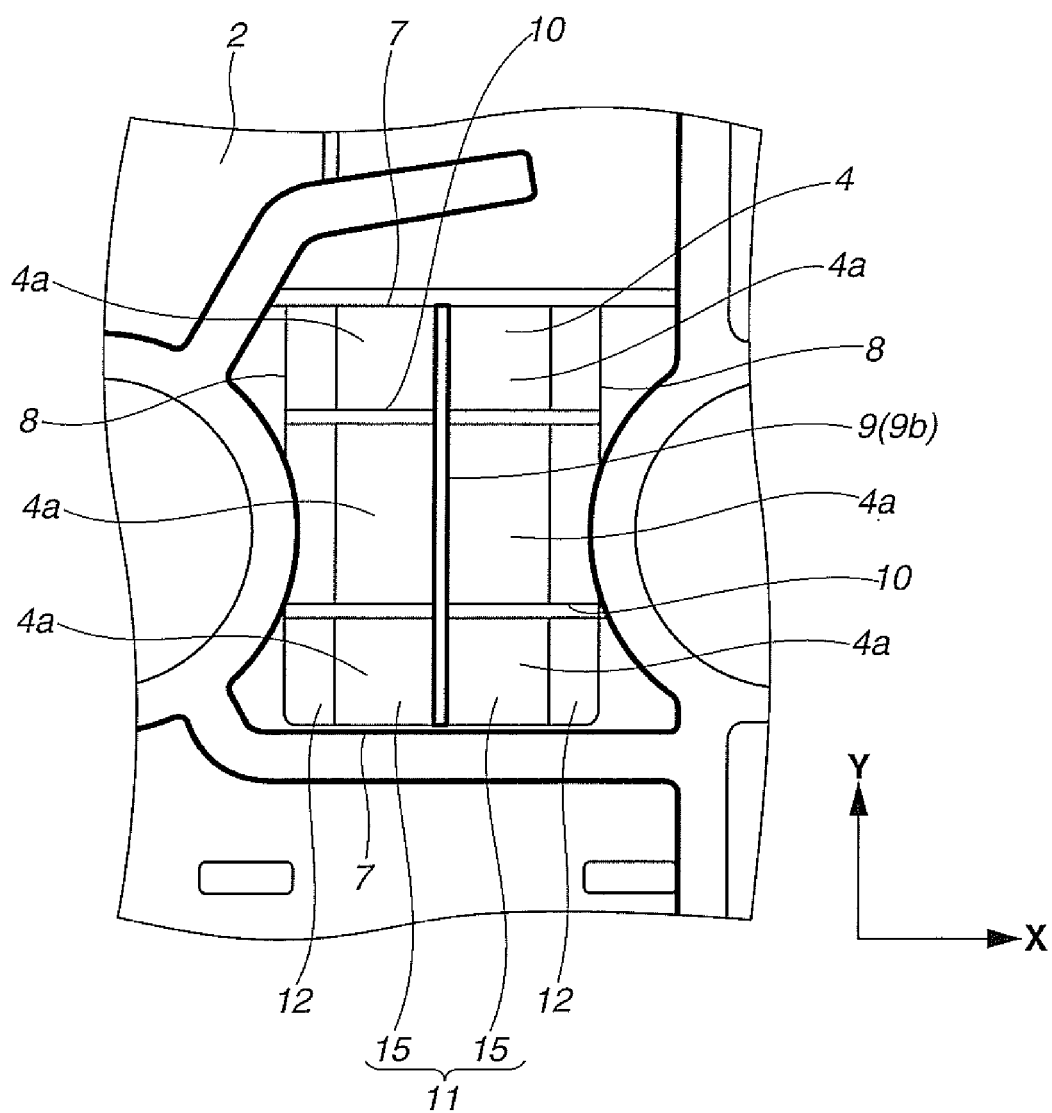
FIG. 2 is an enlarged view of a blow-by gas inlet opening provided by the buffle plate, of which view is taken from the position of the cylinder head cover.

Referring to FIG. 2, there is shown in a larger scale the blow-by gas inlet opening 4 which is viewed from the position of the cylinder head cover 1.

As shown, the blow-by gas inlet opening 4 is generally rectangular in shape and defined by mutually spaced two straight edges 7 and 7 that extend in the X-direction and mutually spaced two straight edges 8 and 8 that extend in the Y-direction and are longer than the straight edges 7 and 7.

Furthermore, as is seen from FIG. 2, the rectangular blow-by gas inlet opening 4 is divided into six rectangular small openings 4a, 4a, 4a, 4a, 4a and 4a by three ribs 9, 10 and 10, which are a transverse rib 9 and two longitudinal ribs 10 and 10. That is, the transverse rib 9 extends across the opening 4 in the Y-direction and the longitudinal ribs 10 and 10 extend across the opening 4 in the X-direction.

Figure 3:
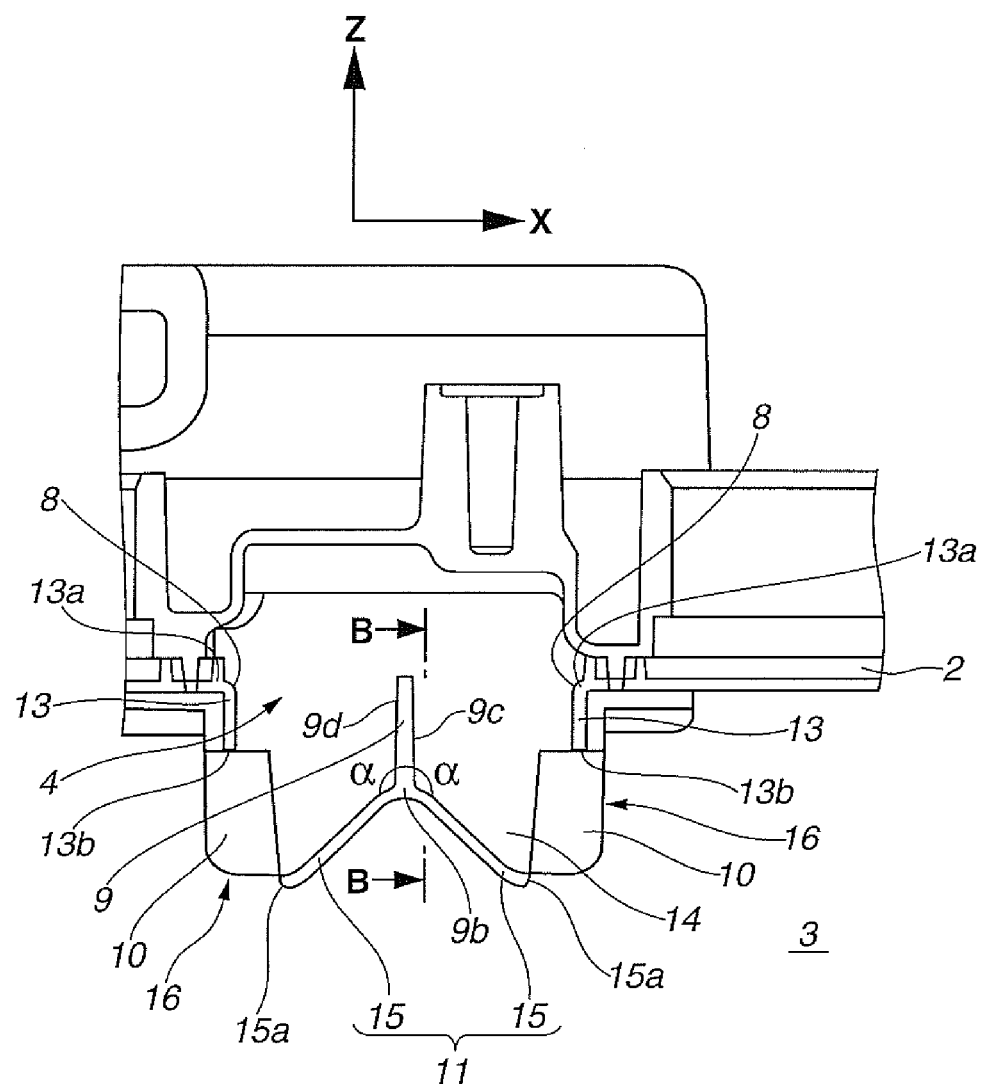
FIG. 3 is a sectional view taken along the line A-A of FIG. 1.
Figure 5:
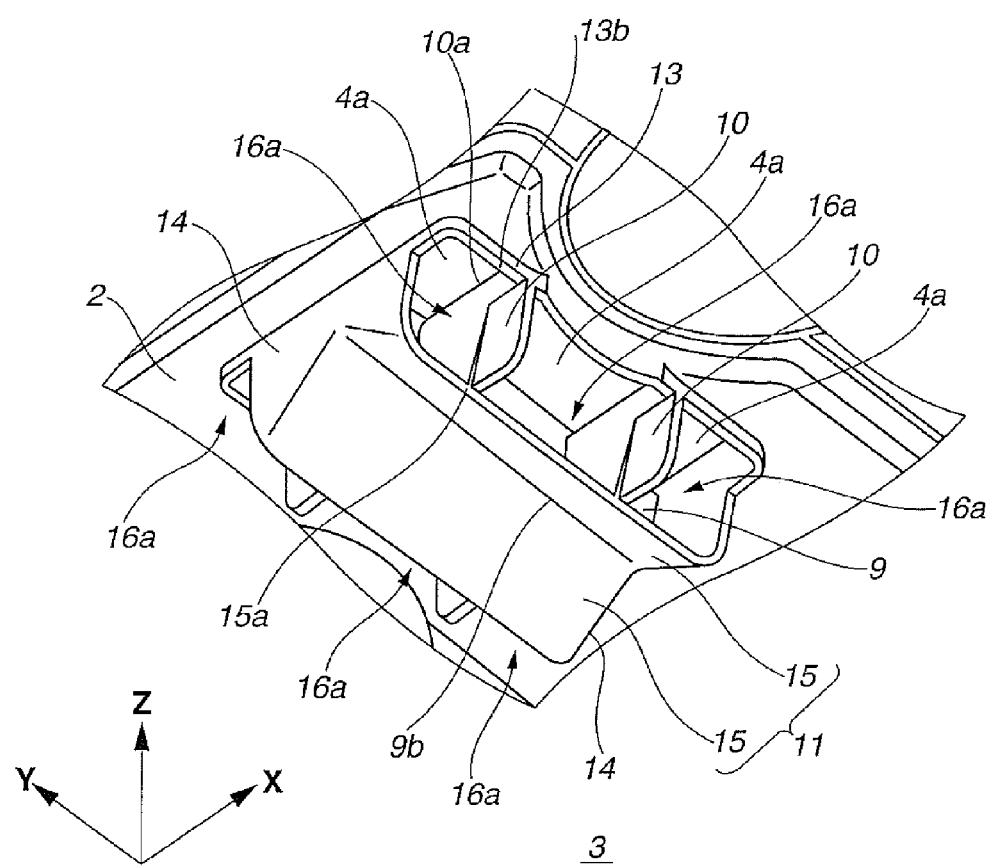
FIG. 5 is a perspective view of the blow-by gas inlet opening taken from the position of a cam chamber.

Furthermore, as is seen from FIGS. 3 and 5, at a lower part (when viewed in FIG. 3) of the blow-by gas inlet opening 4, there is provided an oil blocking structure 11 that has a reversed Y-shaped cross section.

As is seen from FIGS. 2 and 5, the oil blocking structure 11 extends across a generally middle portion of the rectangular blow-by gas inlet opening 4 in the Y-direction leaving two straight zones 12 and 12 near the straight edges 8 and 8 (see FIG. 2).

That is, as will be understood from FIG. 5, only the middle portion of the rectangular blow-by gas inlet opening 4 is covered by the oil blocking structure 11. As is seen from this drawing, the oil blocking structure 11 has a center-depressed bottom wall that has a V-shaped cross section. As shown, the ridge 9b of the center-depressed bottom wall is directed toward the buffle plate 2.

As will be understood from FIGS. 3 and 5, the transverse rib 9 projects upward from the above-mentioned ridge 9b of the center-depressed bottom wall and extends across the longitudinally middle part of the rectangular blow-by gas inlet opening 4 in the X-direction. As shown in FIG. 3, the transverse rib 9 extends along an imaginary plane that is perpendicular to the major surface of the buffle plate 2.

As is seen from FIGS. 3 and 5, from the lower end (viz., ridge) 9b of the transverse rib 9, there extend two (viz., front and rear) inclined flat walls 15 and 15 (see FIG. 5) each indicating a given angle "a" relative to the transverse rib 9. As is seen from FIG. 5, the front and rear inclined flat walls 15 and 15 constitute the above-mentioned center depressed bottom wall.

As is seen from FIGS. 3 and 5, from the straight edges 8 and 8 of the rectangular blow-by gas inlet opening 4, there extend downward front and rear walls 13 and 13 that are perpendicular to the major surface of the buffle plate 2.

As is seen from FIG. 3, between a leading end 15a of the front inclined flat wall 15 and a leading end 13b of the front wall 13, there is defined an inlet opening 16, and between a leading end 15a of the rear inclined flat wall 15 and a leading end 13b of the rear wall 13, there is defined a rear inlet opening 16. It is thus to be noted that the transverse rib 9 is placed between the front and rear inlet openings 16 and 16.

As is seen from FIG. 5, side walls 14 and 14 are integrally provided by the oil blocking structure 11, which extend between transverse ends of the front inlet opening 16 and transverse ends of the rear inlet opening 16. Each side wall 14 has a straight upper edge integrally connected to the corresponding straight edge 7 of the rectangular blow-by gas inlet opening 4. Each side wall 14 has a V-shaped lower edge integrally connected to a corresponding transverse edge of the center depressed bottom wall of the oil blocking structure 11. In the illustrated embodiment, the width of each side wall 14 becomes smaller as it extends downward.

As is seen from FIG. 3, the transverse rib 9 is formed and sized so as to effectively block the splashed oil that is directed toward the rectangular blow-by gas inlet opening 4 after passing through the front and rear inlet openings 16 and 16. More specifically, the height of the transverse rib 9 is so determined as to effectively block the oil that is blown and directed toward respective zones above base portions 13a and 13a of the front and rear walls 13 and 13 after passing through the front and rear inlet openings 16 and 16.

Figure 4:
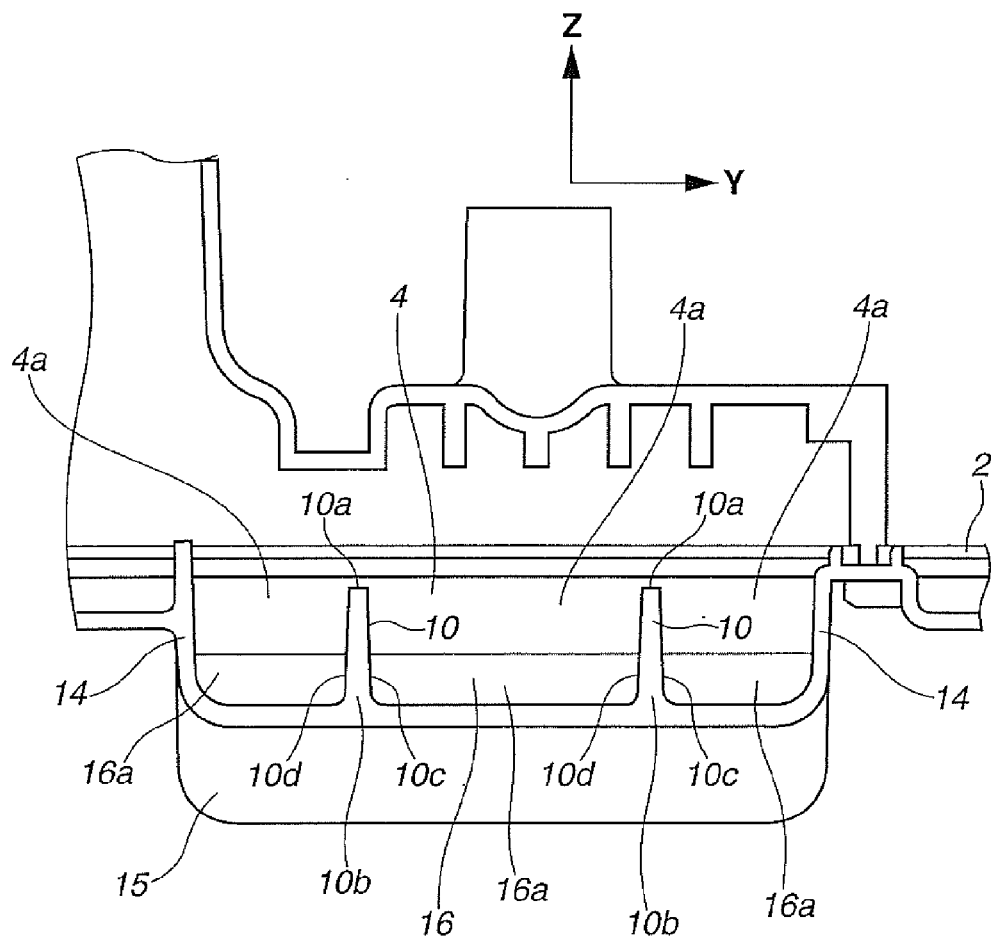
FIG. 4 is a sectional view taken along the line B-B of FIG. 3.

As is seen from FIG. 4, the two longitudinal ribs 10 and 10, which are perpendicular to the transverse rib 9, are spaced from each other in the Y-direction. Each longitudinal rib 10 extends upward from the corresponding inclined flat wall 15. As shown, each longitudinal rib 10 is perpendicular to the major surface of the buffle plate 2.

As is seen from FIG. 4, like the transverse rib 9, each longitudinal rib 10 is so formed and sized as to effectively block the splashed oil that is directed toward the rectangular blow-by gas inlet opening 4 after passing through the front and rear inlet openings 16 and 16.

In the following, the detail of the longitudinal ribs 10 will be described with the aid of FIG. 5.

As is seen from this drawing, the two longitudinal ribs 10 and 10 are placed behind the oil blocking structure 11 and extend in the X-direction. More specifically, the two longitudinal ribs 10 and 10 are placed behind the front and rear inclined flat walls 15 and 15 of the oil blocking structure 11.

As is seen from FIG. 5, each longitudinal rib 10 has longitudinal end portions exposed to the front and rear inlet openings 16 and 16. More specifically, the end portion of each longitudinal rib 10 extends between the leading end 15a of the corresponding inclined flat wall 15 and the leading end 13a of the corresponding wall 13. Due to provision of the two longitudinal ribs 10 and 10, each inlet opening 16 is divided into three small rectangular openings 16a, 16a and 16a. The six small rectangular openings 16a, 16a, 16a, 16a, 16a and 16a thus defined by the front and rear inlet openings 16 and 16 are communicated with the above-mentioned six rectangular small parts 4a, 4a, 4a, 4a, 4a and 4a of the blow-by gas inlet opening 4 respectively.

It is to be noted that the transverse rib 9, longitudinal ribs 10 and 10, oil blocking structure 11, front and rear walls 13 and 13 and side walls 14 and 14 are all integrally molded with the buffle plate 2.

As has been mentioned hereinabove, the rectangular blow-by gas inlet opening 4 of the buffle plate 2 is formed with the transverse rib 9 that extends across the opening 4 in the Y-direction along an imaginary plane that is perpendicular to the major surface of the buffle plate 2, and the front and rear inlet openings 16 and 16 are provided at front and rear positions of the oil blocking structure 11 and each inlet opening 16 is defined between the leading end 15a of the inclined flat wall 15 and the leading end 13b of the wall 13.

Accordingly, as is seen from FIG. 3, front and rear surfaces 9d and 9c of the transverse rib 9 face the front and rear inlet openings 16 and 16.

When the associated internal combustion engine is in operation, the blow-by gas is led into the oil separator chamber, which is provided between the cylinder head cover 1 and the baffle plate 2, through both the front and rear inlet openings 16 and 16 provided beside the oil blocking structure 11 and through the rectangular blow-by gas inlet opening 4 provided by the baffle plate 2. When the blow-by gas is led into the oil separator chamber, oil and oil mist in the blow-by gas are separated.

It is to be noted that during the above operation, lubricant oil that has been splashed up by the intake and exhaust camshafts and carried by the blow-by gas is blocked by the oil blocking structure 11 that is placed at a position just upstream of the rectangular blow-by gas inlet opening 4.

As will be understood from FIGS. 3 and 5, any splashed oil obliquely led into the front and rear inlet openings 16 and 16 together with the blow-by gas impinges against the front and rear surfaces 9d and 9c of the transverse rib 9 and thus the oil is suppressed from entering into the oil separator chamber through the rectangular blow-by gas inlet opening 4. The oil thus collected on the two surfaces 9d and 9c flows down on the surfaces 9d and 9c and then flows down on the front and rear inclined flat walls 15 and 15 of the oil blocking structure 11 and finally drop into the cam chamber 3, as will be understood from FIGS. 3 and 5.

As will be understood from FIG. 4, any splashed oil led into the front and rear inlet openings 16 and 16 from an obliquely lower position in FIG. 5 together with the blow-by gas impinges against inside and outside surfaces 10d and 10c of each longitudinal rib 10 (see FIG. 4) and thus, the oil is suppressed from entering into the oil separator chamber through the rectangular blow-by gas inlet opening 4. Since, as is seen from FIG. 5, each longitudinal rib 10 extends across the corresponding inlet opening 16 in the X-direction while projecting from the inclined flat wall 15, the inside and outside surfaces 10d and 10c can be made larger in size.

As is seen from FIG. 3, due to provision of the inclined flat walls 15 and 15 of the oil blocking structure 11, any oil flowing from the transverse rib 9 and longitudinal ribs 10 and 10 can be smoothly conveyed to the cam chamber 3. Actually, the inclined flat walls 15 and 15 serve as guide means for guiding the oil.

The transverse rib 9, longitudinal ribs 10 and 10, oil blocking structure 11, front and rear walls 13 and 13 and side walls 14 and 14 are integrally molded as a part of the baffle plate 2. This brings about improved formability.

Due to their thinner shape, provision of the two longitudinal ribs 10 and 10 does not narrow the inlet openings 16 and 16 more than required. Thus, the front and rear inlet openings 16 and 16 can have a lower gas flow resistance.

Figure 6:
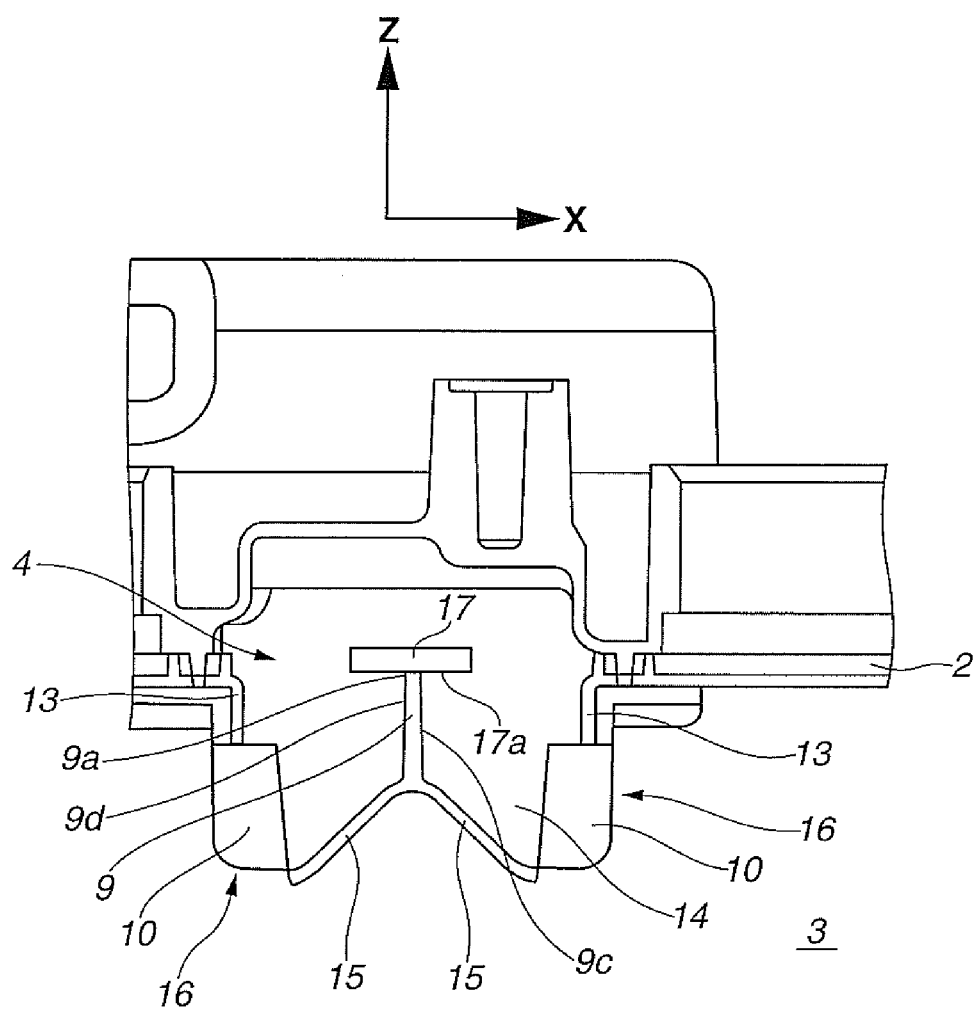
FIG. 6 is a view similar to FIG. 3, but showing another embodiment of the present invention.

In the following, a second embodiment of the present invention will be described with reference to FIG. 6. This drawing corresponds to FIG. 3 of the above-mentioned first embodiment.

Since a blow-by gas inlet structure of the second embodiment is similar to that of the above-mentioned first embodiment, only parts and portions that are different from those of the first embodiment will be descried in detail in the following.

In the second embodiment, an elongate horizontal rib 17 is further employed, which is integrally formed on an upper end 9a of the transverse rib 9.

More specifically, the elongate horizontal rib 17 extends along the transversely extending upper end 9a of the transverse rib 9 and is integrally connected to the upper end 9a. As shown, the width of the rib 17 (viz., the length measured in the X-direction) is smaller than that of the oil blocking structure 11.

Due to provision of such elongate horizontal rib 17, the oil blocking function of the oil blocking structure 11 is much higher than that of the first embodiment. Actually, during flowing of the blow-by gas into the oil separator chamber, the oil splashed and then carried by the blow-by gas impinges against a lower surface 17a of the rib 17 as well as the front and rear surfaces 9d and 9c of the transverse rib 9.

In the following, modifications of the present invention will be described.

If desired, at least one of the inclined flat walls 15 and 15 of the oil blocking structure 11 may extend horizontally, that is, in a direction perpendicular to a major surface of the transverse rib 9.

Furthermore, if desired, the transverse rib 9 may be separated from oil blocking structure 11.

The entire contents of Japanese Patent Application 2014-255722 filed Dec. 18, 2014 are incorporated herein by reference.

Although the invention has been described above with reference to embodiments of the invention, the invention is not limited to such embodiments as described above. Various modifications and variations of such embodiments may be carried to out by those skilled in the art, in light of the above description.

What is claimed is:

1. An internal combustion engine comprising a blow-by gas inlet structure of an oil separator and a cam chamber, the blow-by gas inlet structure placed above the cam chamber, the blow-by gas inlet structure comprising:
 a plate that forms a bottom wall of the oil separator;
 a blow-by gas inlet opening that is formed in the plate;
 an oil blocking structure that is provided below the blow-by gas inlet opening in a manner to divide the blow-by gas inlet opening into front and rear inlet openings through which the blow-by gas is led into the oil separator, the front and rear inlet openings being arranged in a first direction; and
 a transverse rib that is provided on the oil blocking structure and extends in a second direction that is perpendicular to the first direction,
 the oil blocking structure comprising:
 a first inclined flat wall that faces the front inlet opening while being inclined relative to the front inlet opening;
 a second inclined flat wall that faces the rear inlet opening while being inclined relative to the rear inlet opening; and
 a first side wall that extends between one ends of the first and second inclined flat walls; and
 a second side wall that extends between the other ends of the first and second inclined flat walls.

2. An internal combustion engine as claimed in claim 1, in which the oil blocking structure is arranged to extend in the second direction and covers a longitudinally central portion of the blow-by gas inlet opening.

3. An internal combustion engine as claimed in claim 2, in which the transverse rib transversely crosses a center portion of the blow-by gas inlet opening while being spaced from both the front and rear inlet openings (16, 16) by the same distance.

4. An internal combustion engine as claimed in claim 2, further comprising another longitudinal rib that is provided on the oil blocking structure and extends across the blow-by gas inlet opening in the first direction.

5. An internal combustion engine as claimed in claim 4, further comprising a longitudinal rib that is provided on the oil blocking structure and extends across the blow-by gas inlet opening in the first direction.

6. An internal combustion engine as claimed in claim 1, in which the transverse rib is integrally provided with an elongate horizontal rib that extends on and along an upper end of the transverse rib, the width of the elongate horizontal rib being larger than the thickness of the transverse rib.

7. An internal combustion engine comprising a blow-by gas inlet structure of an oil separator and a cam chamber, the blow-by gas inlet structure placed above the cam chamber, the blow-by gas inlet structure comprising:

a plate that forms a bottom wall of the oil separator;

a blow-by gas inlet opening that is formed in the plate;

an oil blocking structure that is provided below the blow-by gas inlet opening in a manner to divide the blow-by gas inlet opening into front and rear inlet openings through which the blow-by gas is led into the oil separator, the front and rear inlet openings being arranged in a first direction;

a transverse rib that is provided on the oil blocking structure and extends in a second direction that is perpendicular to the first direction; and first and second longitudinal ribs that are provided on the oil blocking structure and extend across the blow-by gas inlet opening in the first direction, the oil blocking structure comprising:

a first inclined flat wall that faces the front inlet opening while being inclined relative to the front inlet opening;

a second inclined flat wall that faces the rear inlet opening while being inclined relative to the rear inlet opening; and a first side wall that extends between one ends of the first and second inclined flat walls; and a second side wall that extends between the other ends of the first and second inclined flat walls.

* * * * *